United States Patent
Niizuma

(10) Patent No.: US 9,634,524 B2
(45) Date of Patent: Apr. 25, 2017

(54) WIRELESS POWER SUPPLY SYSTEM

(71) Applicant: IHI Corporation, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 117 days.

(21) Appl. No.: 14/741,680

(22) Filed: Jun. 17, 2015

(65) Prior Publication Data

US 2015/0288226 A1    Oct. 8, 2015

Related U.S. Application Data

(63) Continuation of application No. PCT/JP2013/082433, filed on Dec. 3, 2013.

(30) Foreign Application Priority Data

Jan. 8, 2013  (JP) ................. 2013-001071

(51) Int. Cl.
| | | |
|---|---|---|
| H01F 27/42 | (2006.01) | |
| H01F 37/00 | (2006.01) | |
| H01F 38/00 | (2006.01) | |
| H02J 17/00 | (2006.01) | |
| H02J 50/00 | (2016.01) | |
| H02J 50/10 | (2016.01) | |
| H02J 50/90 | (2016.01) | |
| H02J 5/00 | (2016.01) | |
| H02J 7/02 | (2016.01) | |

(52) U.S. Cl.
CPC .............. *H02J 17/00* (2013.01); *H02J 5/005* (2013.01); *H02J 7/025* (2013.01); *H02J 50/00* (2016.02); *H02J 50/10* (2016.02); *H02J 50/90* (2016.02)

(58) Field of Classification Search
CPC .. H02J 5/005; H02J 7/025; H02J 17/00; H02J 50/00; H02J 50/10; H02J 50/90
USPC ......................................... 307/104
See application file for complete search history.

(56) References Cited

U.S. PATENT DOCUMENTS

2008/0296979 A1    12/2008  Kato et al.
2010/0007214 A1*    1/2010  Howard ............... B60L 11/182
                                                     307/104
(Continued)

FOREIGN PATENT DOCUMENTS

JP     01-156890 A     6/1989
JP     02-032721 A     2/1990
(Continued)

OTHER PUBLICATIONS

International Search Report, PCT/JP2013/082433, Jan. 7, 2014, 2 pgs.

*Primary Examiner* — Carlos Amaya
(74) *Attorney, Agent, or Firm* — Volpe and Koenig, P.C.

(57) ABSTRACT

A wireless power supply system includes a power-supplying device mounted on one of a mobile object and a structure different from the mobile object and a power-receiving device mounted on the other of the mobile object and the structure and supplies electric power from the power-supplying device to the power-receiving device disposed to face the power-supplying device under water or on surface of water. The wireless power supply system includes a contact portion that is disposed in the mobile object and that comes in contact with the structure and a thruster that presses the contact portion against the structure during the transmission of electric power.

10 Claims, 8 Drawing Sheets

(56) References Cited

U.S. PATENT DOCUMENTS

| | | |
|---|---|---|
| 2010/0104031 A1 | 4/2010 | Lacour |
| 2011/0133692 A1 | 6/2011 | Shimoyama |
| 2011/0221387 A1 | 9/2011 | Steigerwald et al. |

FOREIGN PATENT DOCUMENTS

| | | |
|---|---|---|
| JP | 07-223589 A | 8/1995 |
| JP | 08-505277 A | 6/1996 |
| JP | 09-172743 A | 6/1997 |
| JP | 09-215210 A | 8/1997 |
| JP | 11-191146 A | 7/1999 |
| JP | 2004-166459 A | 6/2004 |
| JP | 2008-295273 A | 12/2008 |
| JP | 2010-011696 A | 1/2010 |
| JP | 2010-523030 A | 7/2010 |
| JP | 2011-035953 A | 2/2011 |
| JP | 2011-120380 A | 6/2011 |
| JP | 2011-151351 A | 8/2011 |
| JP | 2011-188736 A | 9/2011 |
| JP | 2011-259649 A | 12/2011 |
| KR | 10-2011-0012324 A | 2/2011 |
| WO | 94/09558 A1 | 4/1998 |

\* cited by examiner

US 9,634,524 B2

WIRELESS POWER SUPPLY SYSTEM

TECHNICAL FIELD

The present disclosure relates to a wireless power supply system.

This application is a continuation application based on a PCT Patent Application No. PCT/JP2013/082433, filed on Dec. 3, 2013, whose priority is claimed on Japanese Patent Application No. 2013-001071, filed on Jan. 8, 2013. The contents of both the PCT Application and the Japanese Application are incorporated herein by reference.

BACKGROUND ART

For example, Patent Documents 1 and 2 disclose a wireless power supply system that supplies electric power from a storage battery mounted on an underwater mobile object to a storage battery installed in an underwater facility in a wireless manner. Recently, a wireless power supply system in which electric power is supplied in a wireless manner under water or on surface of water to a storage battery installed in a mobile object such as a working robot, which works while moving under water or on surface of water, has been proposed.

The term "wireless" in such a wireless power supply system means that an electric power transmission wire of a power-supplying device does not directly contact with an electric power transmission wire of a power-receiving device, and does not mean that a mobile object on which one of the power-supplying device and the power-receiving device is mounted is not in contact with a structure on which the other of the power-supplying device and the power-receiving device is mounted. In order to stably transmit electric power, it is desirable that the positional relationship between the power-supplying device and the power-receiving device be fixed. Accordingly, as disclosed in Patent Documents 1 and 2, the mobile object and the structure are firmly fitted and fixed to each other during the transmission of electric power.

CITATION LIST

Patent Document

[Patent Document 1]
Published Japanese Translation No. 2010-523030 of the PCT International Publication
[Patent Document 2]
Japanese Unexamined Patent Application, First Publication No. H2-32721

SUMMARY

Technical Problem

However, under water or on surface of water, a large force may act in a direction in which the mobile object and the structure are separated from each other due to a rapid change of a tidal current, an influence from big waves, collisions with fish, or the like. When the large force acts, if the mobile object and the structure are firmly fitted to each other as in Patent Documents 1 and 2, the fitted portion may be damaged and may have to be repaired in some cases, and an operator's burden will increase.

The present disclosure is made in consideration of the aforementioned problems and an object of the present disclosure is to construct a wireless power supply system that can prevent a mobile object and a structure from being damaged.

Solution to Problem

The present disclosure employs the following configurations as means for achieving the aforementioned object.

According to a first aspect of the present disclosure, there is provided a wireless power supply system that includes a power-supplying device mounted on one of a mobile object and a structure different from the mobile object and a power-receiving device mounted on the other of the mobile object and the structure and supplies electric power from the power-supplying device to the power-receiving device disposed to face the power-supplying device under water or on surface of water, the wireless power supply system including: a contact portion that is disposed in the mobile object and comes in contact with the structure; and a thruster that presses the contact portion against the structure during the transmission of electric power.

A second aspect of the present disclosure provides the wireless power supply system according to the first aspect, including a receiver portion that is disposed in the structure, receives the contact portion, and positions the mobile object.

A third aspect of the present disclosure provides the wireless power supply system according to the first or second aspect, including: a position detecting device that detects a positional relationship between the power-supplying device and the power-receiving device; and a power transmission stopping device that stops the transmission of electric power when the detection result of the position detecting device indicates that the positional relationship between the power-supplying device and the power-receiving device departs from a reference position.

A fourth aspect of the present disclosure provides the wireless power supply system according to the third aspect, wherein the position detecting device includes a metal piece that is disposed in one of the mobile object and the structure on which the power-receiving device is mounted and a metal detecting device that is disposed in one of the mobile object and the structure on which the power-supplying device is mounted and detects the metal piece in a wireless manner.

A fifth aspect of the present disclosure provides the wireless power supply system according to the third aspect, wherein the position detecting device includes an ultrasonic wave transmitting device that is disposed in one of the mobile object and the structure on which the power-receiving device is mounted and an ultrasonic wave receiving device that is disposed in one of the mobile object and the structure on which the power-supplying device is mounted.

A sixth aspect of the present disclosure provides the wireless power supply system according to the fifth aspect, wherein the contact portion functions as a waveguide that transmits an ultrasonic wave transmitted from the ultrasonic wave transmitting device to the ultrasonic wave receiving device.

Advantageous Effects

According to the present disclosure, the contact portion installed in the mobile object is pressed against the structure by the thruster during the transmission of electric power. Accordingly, the static frictional force between the contact portion and the structure increases and thus the mobile object and the structure are fixed to each other. Therefore, it is possible to stably transmit electric power. When an external force for separating the mobile object and the structure from each other acts for a certain reason and the external force is greater than the static frictional force between the contact portion and the structure, the mobile object and the structure are separated from each other. However, since the mobile object and the structure are not fitted to each other, the mobile object and the structure are not damaged. As a result, according to the present disclosure, it is possible to obtain a wireless power supply system that can prevent a mobile object and a structure from being damaged.

DESCRIPTION OF EMBODIMENTS

Hereinafter, a wireless power supply system according to an embodiment of the present disclosure will be described with reference to the accompanying drawings. In the following drawings, scales of elements are different among the elements so that the elements appear in recognizable size.

First Embodiment

Figure 1:
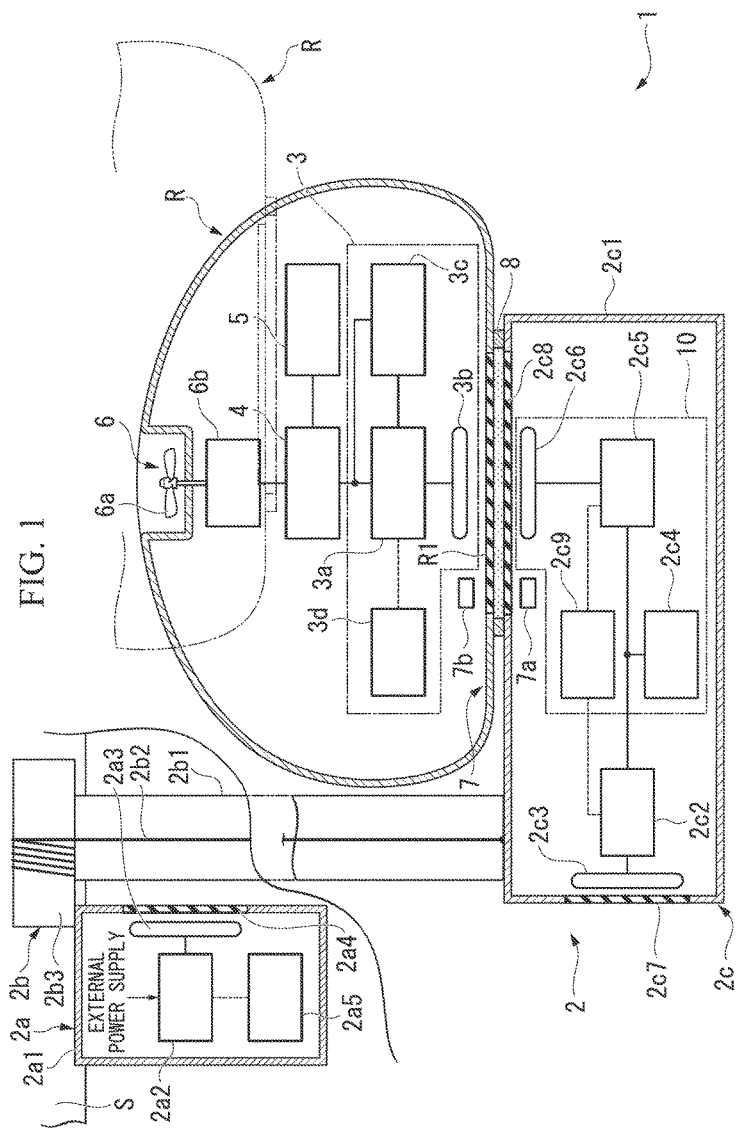
FIG. 1 is a schematic diagram showing a schematic configuration of a wireless power supply system according to a first embodiment of the present disclosure.

FIG. 1 is a schematic diagram showing a schematic configuration of a wireless power supply system 1 according to a first embodiment of the present disclosure. In addition to the wireless power supply system 1, FIG. 1 illustrates an underwater exploration robot R (mobile object) on which a power-receiving device 3, which will be described later of the wireless power supply system 1 is mounted. As shown in FIG. 1, the wireless power supply system 1 according to this embodiment includes charging equipment 2, a power-receiving device 3, an inverter 4, an inverter controller 5, a thruster 6, a position detector 7 (a position detecting device), and a contact portion 8.

The charging equipment 2 includes a power-supplying station 2a, a lifting device 2b, and a charging station 2c. The power-supplying station 2a is installed in a ship S (or a sea base or the like) anchored on the sea and includes a case 2a1 that is fixed to the ship S in a state in which its bottom is immersed in water, a power-supplying circuit 2a2 that is stowed in the case 2a1, a power-transmitting coil 2a3 that is connected to the power-supplying circuit 2a2, a magnetic field transparent portion 2a4 that is installed in a part of the case 2a1, and a controller 2a5.

The power-supplying circuit 2a2 is connected to an external power source (for example, a power generation system or a storage battery installed in the ship S or the sea base) and converts electric power supplied from the external power source into high-frequency power suitable for wireless transmission of electric power. The power-supplying circuit 2a2 includes a capacitor that constitutes a resonator together with the power-transmitting coil 2a3. The power-transmitting coil 2a3 is disposed in the case 2a1 so as to face the magnetic field transparent portion 2a4. The power-transmitting coil 2a3 constitutes a resonator together with the capacitor of the power-supplying circuit 2a2 and generates an oscillating magnetic field by being supplied with AC power from the power-supplying circuit 2a2.

The magnetic field transparent portion 2a4 is disposed in water in a shape that covers a side, from which the oscillating magnetic field is generated, of the power-transmitting coil 2a3 and allows the oscillating magnetic field, which is generated by the resonator including the power-transmitting coil 2a3, to penetrate to the outside of the case 2a1. The magnetic field transparent portion 2a4 is formed of a material which has water resistance and pressure resistance and does not disturb a magnetic field, that is, a nonconductive and nonmagnetic material (for example, plastics or fiber-reinforced plastics having water resistance and pressure resistance).

The controller 2a5 is electrically connected to the power-supplying circuit 2a2 and controls the power-supplying circuit 2a2 based on a control command input from the outside. The controller 2a5 is also electrically connected to the lifting device 2b and also controls the charging station 2c, for example, using wireless communication.

The lifting device 2b is disposed with the power-supplying circuit 2a2 and includes a lifting rail 2b1 that guides the charging station 2c in the vertical direction, a wire 2b2 that suspends the charging station 2c, and a winch 2b3 that winds the wire 2b2. The lifting device 2b vertically moves the charging station 2c along the lifting rail 2b1 using the winch 2b3.

The charging station 2c includes a case 2c1, a power-receiving circuit 2c2, a power-receiving coil 2c3, a storage battery 2c4, a power-supplying circuit 2c5, a power-transmitting coil 2c6, a first magnetic field transparent portion 2c7, a second magnetic field transparent portion 2c8, and a controller 2c9.

The top of the case 2c1 is connected to the wire 2b2 of the lifting device 2b, and stows the power-receiving circuit 2c2, the power-receiving coil 2c3, the storage battery 2c4, the power-supplying circuit 2c5, and the power-transmitting coil 2c6. A part of the top surface of the case 2c1 functions as a platform of the underwater exploration robot R.

The power-receiving circuit 2c2 converts electric power transmitted from the power-supplying station 2a into DC power to be stored in the storage battery 2c4. The power-receiving circuit 2c2 includes a capacitor that constitutes a resonator together with the power-receiving coil 2c3. The power-receiving coil 2c3 is disposed in the case 2c1 so as to face the first magnetic field transparent portion 2c7. The power-receiving coil 2c3 constitutes a resonator together with the capacitor of the power-receiving coil 2c2. When the charging station 2c is lifted up and the power-transmitting coil 2a3 of the power-supplying station 2a and the power-receiving coil 2c3 are positioned with a positional relationship suitable for the wireless supply of electric power, that is, a positional relationship in which both substantially face each other, the power-receiving coil 2c3 resonates by an oscillating magnetic field generated in the power-supplying station 2a and thus generates high-frequency power. As a result, electric power is supplied from the power-supplying station 2a to the charging station 2c in a wireless manner.

The storage battery 2c4 is connected to the power-receiving circuit 2c2 and the power-supplying circuit 2c5, temporarily stores DC power supplied from the power-receiving circuit 2c2, and discharges the stored electric power when electric power is not supplied from the power-receiving circuit 2c2. For example, a secondary battery such as a lithium ion battery or a lead storage battery can be used as the storage battery 2c4.

The power-supplying circuit 2c5 converts electric power supplied from the storage battery 2c4 into high-frequency power suitable for the wireless transmission of electric power. The power-supplying circuit 2c5 includes a capacitor that constitutes a resonator together with the power-transmitting coil 2c6. The power-transmitting coil 2c6 is disposed in the case 2c1 so as to face the second magnetic field transparent portion 2c8. The power-transmitting coil 2c6 constitutes a resonator together with the capacitor of the power-supplying circuit 2c5 and generates an oscillating magnetic field by being supplied with AC power from the power-supplying circuit 2c5.

The first magnetic field transparent portion 2c7 is disposed on a side wall of the case 2c1 facing the power-supplying station 2a side in a shape that covers the side, which receiving the oscillating magnetic field, of the power-receiving coil 2c3, and allows the oscillating magnetic field, which is received by the resonator including the power-receiving coil 2c3, to penetrate from the outside of the case 2c1 to the inside. The second magnetic field transparent portion 2c8 is disposed on the top of the case 2c1 in a shape that covers the side, which generates the oscillating magnetic field, of the power-transmitting coil 2c6 and an induction-type proximity sensor 7a to be described later, and allows the oscillating magnetic field, which is generated by the resonator including the power-transmitting coil 2c6, to transmit to the outside of the case 2c1. The second magnetic field transparent portion 2c8 is provided with the induction-type proximity sensor 7a of the position detector 7 in addition to the power-transmitting coil 2c6. The first magnetic field transparent portion 2c7 and the second magnetic field transparent portion 2c8 are formed of a material which has water resistance and pressure resistance and does not disturb a magnetic field, that is, a nonconductive and non-magnetic material (for example, plastics or fiber-reinforced plastics having water resistance and pressure resistance).

The controller 2c9 is electrically connected to the power-receiving circuit 2c2 and the power-supplying circuit 2c5. When electric power is supplied from the power-supplying station 2a to the charging station 2c in a wireless manner, the controller 2c9 controls the power-receiving circuit 2c2 based on a control command input from the controller 2a5 of the power-supplying station 2a. On the other hand, when electric power is supplied from the charging station 2c to the power-receiving device 3 in a wireless manner, the controller 2c9 controls the power-supplying circuit 2c5. The controller 2c9 is connected to the induction-type proximity sensor 7a to be described later of the position detector 7, and stops the supply of electric power from the charging station 2c to the power-receiving device 3 when a metal piece 7b to be described later is not detected by the induction-type proximity sensor 7a. That is, the controller 2c9 functions as a power transmission stopping device in the present disclosure. When the detection result of the position detector 7 indicates that the positional relationship between the power-supplying device 10 and the power-receiving device 3 to be described later departs from a position (referred to as reference position) suitable for the transmission of electric power, the controller 2c9 stops the transmission of electric power.

In this embodiment, the power-supplying device (hereinafter referred to as a power-supplying device 10 as shown in FIG. 1) of the present disclosure is constituted by the storage battery 2c4, the power-supplying circuit 2c5, the power-transmitting coil 2c6, and the controller 2c9. As shown in FIG. 1, since the power-supplying device 10 is installed in the case 2c1, the case 2c1 in this embodiment corresponds to the structure in the present disclosure.

The power-receiving device 3 is mounted on the underwater exploration robot R and includes a power-receiving circuit 3a, a power-receiving coil 3b, a storage battery 3c, and a controller 3d. The power-receiving circuit 3a converts electric power, which is transmitted from the charging station 2c, into DC power to be stored in the storage battery 3c. The power-receiving circuit 3a includes a capacitor that constitutes a resonator together with the power-receiving coil 3b. The power-receiving coil 3b is disposed in the underwater exploration robot R so as to face a magnetic field transparent portion R1 disposed on the bottom of the underwater exploration robot R. The power-receiving coil 3b constitutes a resonator together with the capacitor of the power-receiving circuit 3a. When the charging station 2c and the underwater exploration robot R have a positional relationship suitable for the wireless supply of electric power, that is, a positional relationship in which the power-transmitting coil 2c6 of the charging station 2c and the power-receiving coil 3b substantially face each other, the power-receiving coil 3b resonates due to the oscillating magnetic field generated by the charging station 2c and thus generates high-frequency power. As a result, electric power is supplied from the charging station 2c to the power-receiving device 3 in a wireless manner. The magnetic field transparent portion R1 has a shape that covers the side, which receives the oscillating magnetic field, of the power-receiving coil 3b and the metal piece 7b to be described later.

The storage battery 3c is connected to the power-receiving circuit 3a and the inverter 4. The storage battery 3c temporarily stores DC power supplied from the power-receiving circuit 3a and discharges the stored electric power when electric power is not supplied from the power-receiving circuit 3a. For example, a secondary battery such as a lithium ion battery or a lead storage battery can be used as the storage battery 3c. The controller 3d is electrically connected to the power-receiving circuit 3a and controls the power-receiving circuit 3a, for example, based on a control command input from a main controller (not shown) of the underwater exploration robot R. In this embodiment, the controller 3d may be integrated with the main controller of the underwater exploration robot R or with the inverter controller 5.

The inverter 4 converts DC power supplied from the power-receiving device 3 into AC power for driving a motor 6b of the thruster 6 to be described later under the control of the inverter controller 5. The inverter controller 5 controls the inverter 4 under the control of the main controller of the underwater exploration robot R. The inverter controller 5 controls the inverter 4 so as to supply AC power to the motor 6b of the thruster 6 when electric power is transmitted from the charging station 2c to the power-receiving device 3. The inverter controller 5 may be integrated with the controller 3*d* of the power-receiving device 3 or with the main controller (not shown) of the underwater exploration robot R.

The thruster 6 includes a screw propeller 6*a* that generates downward thrust and a motor 6*b* that rotationally drives the screw propeller 6*a*. The motor 6*b* generates rotational power by being supplied with AC power through the inverter 4. The thruster 6 presses the contact portion 8 against the case 2*c*1 of the charging station 2*c* when electric power is transmitted from the charging station 2*c* to the power-receiving device 3 disposed in the underwater exploration robot R. When there is a thruster for propulsion disposed in the underwater exploration robot R, for example, the thruster 6 may be integrated with this thruster. On the other hand, when the thruster 6 is provided apart from a thruster disposed in the underwater exploration robot R and the thruster 6 is used solely for pressing the contact portion 8 against the case 2*c*1, the thruster 6 is preferably disposed at the center of the contact portion 8 when viewed from the case 2*c*1 side. Accordingly, the entire contact portion 8 can be pressed with a uniform force so as to be stably pressed against the case 2*c*1.

The position detector 7 includes the induction-type proximity sensor 7*a* (a metal detecting device) and the metal piece 7*b*. The induction-type proximity sensor 7*a* is disposed in the case 2*c*1 of the charging station 2*c* so as to face the second magnetic field transparent portion 2*c*8 as shown in FIG. 1. The induction-type proximity sensor 7*a* is disposed at a position laterally departing from the power-transmitting coil 2*c*6 so as not to be affected by the magnetic field generated by the power-transmitting coil 2*c*6. When the metal piece 7*b* is located close to the sensor, the induction-type proximity sensor 7*a* detects the metal piece 7*b* and outputs the detection result. As shown in FIG. 1, the metal piece 7*b* is disposed in the underwater exploration robot R so as to face the magnetic field transparent portion R1. The metal piece 7*b* is disposed at a position laterally departing from the power-receiving coil 3*b* so as not to be affected by the magnetic field generated by the power-transmitting coil 2*c* 6. The induction-type proximity sensor 7*a* and the metal piece 7*b* are disposed in such a way that the induction-type proximity sensor 7*a* detects the metal piece when the charging station 2*c* and the underwater exploration robot R have a positional relationship suitable for the wireless supply of electric power.

The induction-type proximity sensor 7*a* is connected to the controller 2*c*9 of the charging station 2*c*. The controller 2*c*9 stops the supply of electric power from the charging station 2*c* to the power-receiving device 3 when the metal piece 7*b* is not detected by the induction-type proximity sensor 7*a*. That is, the controller 2*c*9 functions as the power transmission stopping device in the present disclosure and stops the transmission of electric power when the detection result of the position detector 7 indicates that the positional relationship between the power-supplying device 10 and the power-receiving device 3 departs from the position (referred to as a reference position) suitable for the transmission of electric power.

Figure 2:
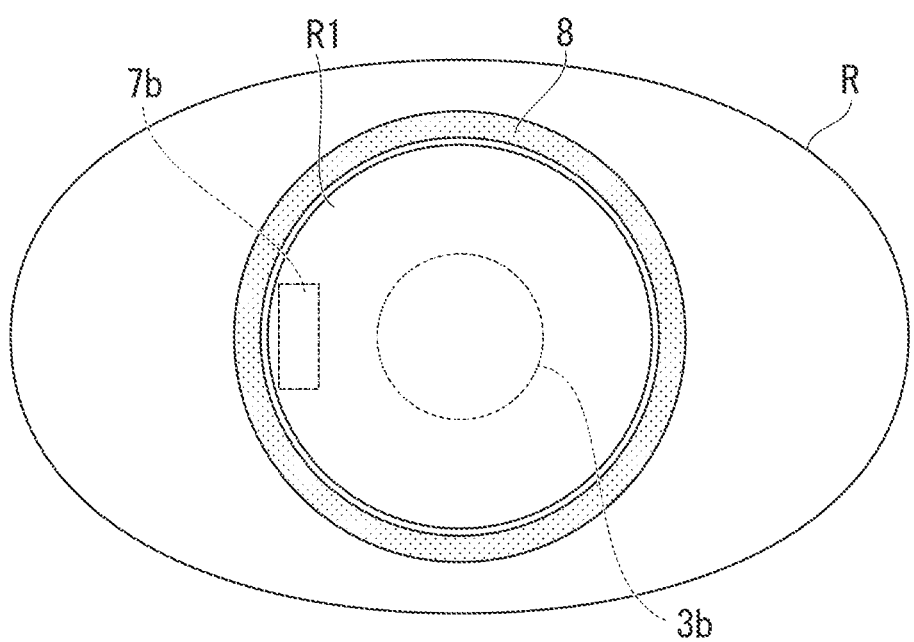
FIG. 2 is a bottom view of an underwater exploration robot when viewed from the bottom side.

The contact portion 8 is installed on the bottom surface of the underwater exploration robot R. FIG. 2 is a bottom view of the underwater exploration robot R when viewed from the bottom side. As shown in the drawing, the contact portion 8 is a ring-shaped member that surrounds the magnetic field transparent portion R1 and the bottom surface of the contact portion 8 is a flat surface. The contact portion 8 comes in contact with the top surface of the case 2*c*1 of the charging station 2*c* when electric power is transmitted from the charging station 2*c* to the power-receiving device 3 mounted on the underwater exploration robot R.

The operation of the wireless power supply system 1 according to this embodiment having the aforementioned configuration will be described below.

For example, when the state of charge of the storage battery 3*c* of the power-receiving device 3 decreases to an amount at which charging is required, the charging station 2*c* is first lifted up through the operation of the lifting device 2*b* and is disposed to face the power-supplying station 2*a*, and then electric power is transmitted from the power-supplying station 2*a* to the charging station 2*c*. Here, an oscillating magnetic field is generated by supplying electric power from an external power source to the power-supplying circuit 2*a*2 and the power-transmitting coil 2*a*3, and electric power is transmitted to the power-receiving coil 2*c*3 and the power-receiving circuit 2*c*2 of the charging station 2*c* by resonance due to the oscillating magnetic field. The electric power transmitted to the charging station 2*c* is stored in the storage battery 2*c*4.

Subsequently, the charging station 2*c* is lowered through the operation of the lifting device 2*b*, and the underwater exploration robot R moves above the case 2*c*1 of the charging station 2*c* so that the positional relationship between the power-supplying device 10 and the power-receiving device 3 is the reference position. Subsequently, the inverter controller 5 controls the inverter 4 so as to drive the thruster 6. As a result, the thruster 6 presses the contact portion 8 against the case 2*c*1. In this state, electric power is transmitted from the power-supplying device 10 disposed in the charging station 2*c* to the power-receiving device 3 disposed to face the power-supplying device. Here, an oscillating magnetic field is generated by supplying electric power from the storage battery 2*c*4 to the power-supplying circuit 2*c*5 and the power-transmitting coil 2*c*6, and electric power is transmitted to the power-receiving coil 3*b* and the power-receiving circuit 3*a* of the power-receiving device 3 by resonance due to the oscillating magnetic field. Some of the electric power supplied to the power-receiving device 3 is transmitted to the inverter 4 and is used to drive the thruster 6, and the rest of the electric power is stored in the storage battery 3*c*.

The controller 2*c*9 permits the transmission of electric power when the detection result of the position detector 7 indicates that the positional relationship between the power-supplying device 10 and the power-receiving device 3 is the reference position, and stops the transmission of electric power when the detection result indicates that the positional relationship departs from the reference position.

In the wireless power supply system 1 according to this embodiment, the contact portion 8 disposed in the underwater exploration robot R is pressed against the case 2*c*1 by the thruster 6 during the transmission of electric power. Accordingly, the static frictional force between the contact portion 8 and the case 2*c*1 increases and the underwater exploration robot R and the case 2*c*1 are fixed to each other. As a result, it is possible to stably supply electric power. When an external force for separating the underwater exploration robot R and the case 2*c*1 from each other acts for a certain reason and the external force is greater than the static frictional force between the contact portion 8 and the case 2*c*1, the underwater exploration robot R and the case 2*c*1 are separated from each other. However, since the underwater exploration robot R and the case 2*c*1 are not fitted to each other, the underwater exploration robot R and the case 2*c*1 are not damaged. Accordingly, in the wireless power supply system 1 according to this embodiment, it is possible to prevent the underwater exploration robot R or the case 2c1 from being damaged.

The wireless power supply system 1 according to this embodiment includes the position detector 7 that detects the positional relationship between the power-supplying device 10 and the power-receiving device 3 and the controller 2c9 that stops the transmission of electric power when the detection result of the position detector 7 indicates that the positional relationship between the power-supplying device 10 and the power-receiving device 3 departs from the reference position. Accordingly, when the underwater exploration robot R and the case 2c1 are separated from each other during the transmission of electric power due to an unexpected external force, it is possible to stop the transmission of electric power and to prevent unintended discharge of energy.

In the wireless power supply system 1 according to this embodiment, the position detector 7 includes the metal piece 7b that is disposed in the underwater exploration robot R and the induction-type proximity sensor 7a that is disposed in the case 2c1 so as to detect the metal piece 7b in a wireless manner. Accordingly, it is possible to easily detect the positional relationship between the underwater exploration robot R and the case 2c1 with a simple configuration.

Second Embodiment

A second embodiment of the present disclosure will be described below. In this embodiment, description of elements common to those in the first embodiment will be omitted or simplified.

Figure 3:
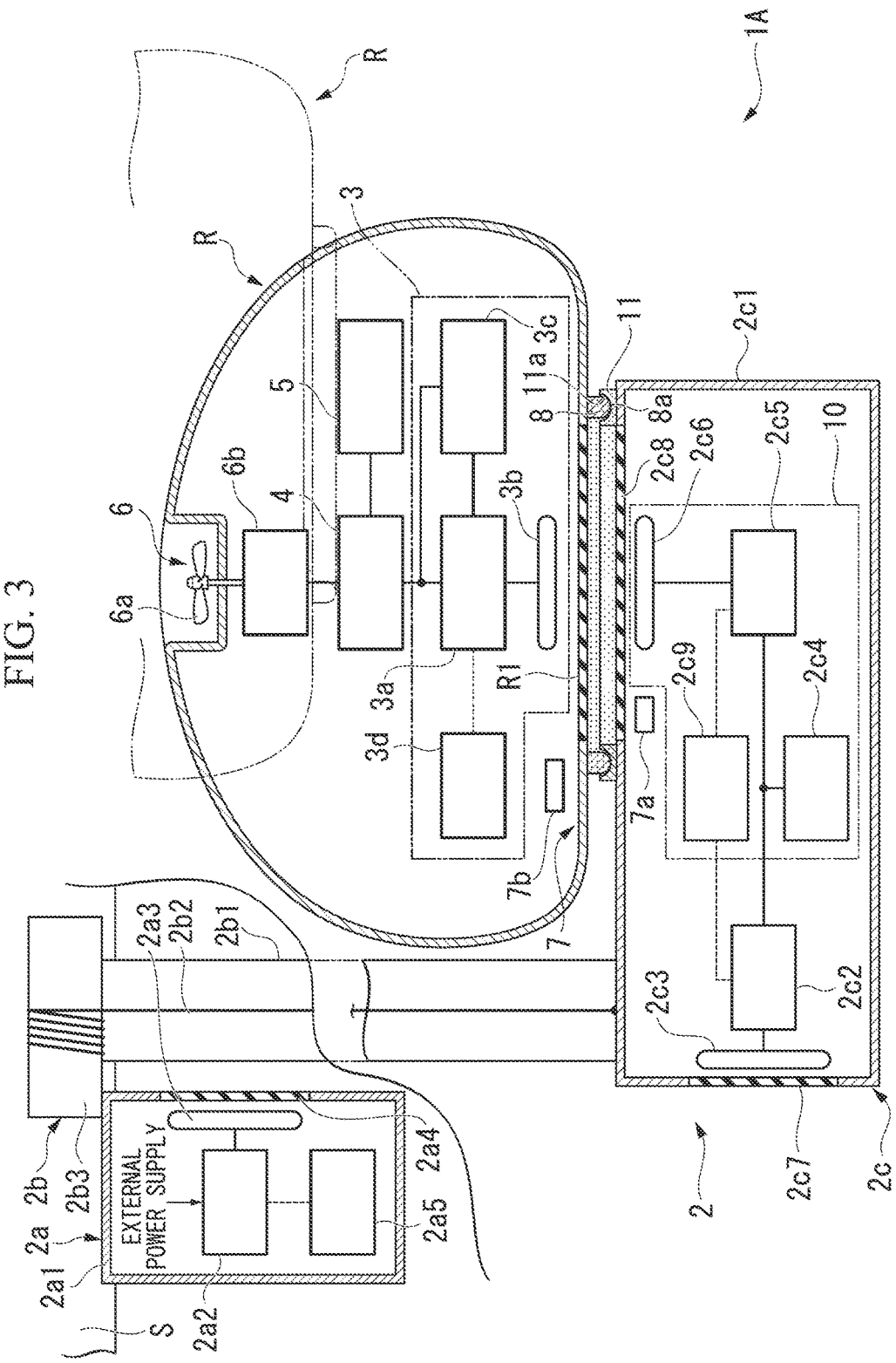
FIG. 3 is a schematic diagram showing a schematic configuration of a wireless power supply system according to a second embodiment of the present disclosure.

FIG. 3 is a schematic diagram showing a schematic configuration of a wireless power supply system 1A according to this embodiment. As shown in the drawing, in the wireless power supply system 1A according to this embodiment, a receiver portion 11 that receives the contact portion 8 is disposed on the top surface of the case 2c1.

The receiver portion 11 has a ring shape similarly to the contact portion 8 and a recessed portion 11a is formed on its top surface. The receiver portion 11 receives the contact portion 8 and guides the underwater exploration robot R using the recessed portion 11a. The depth of the recessed portion 11a is set so that the contact portion 8 is easily separated from the receiver portion 11 when an external force for separating the underwater exploration robot R and the case 2c1 from each other acts for a certain reason. A protruding portion 8a corresponding to the recessed portion 11a is disposed on the bottom surface of the contact portion 8.

In the wireless power supply system 1A according to this embodiment having the aforementioned configuration, the underwater exploration robot R (that is, the power-receiving device 3) is positioned by allowing the protruding portion 8a of the contact portion 8 to go into the recessed portion 11a when the contact portion 8 is received by the receiver portion 11. Accordingly, the power-transmitting coil 2c6 and the power-receiving coil 3b get located so as to more exactly face each other and it is thus possible to transmit electric power more stably.

Third Embodiment

A third embodiment of the present disclosure will be described below. In this embodiment, description of elements common to those in the first embodiment will be omitted or simplified.

Figure 4:
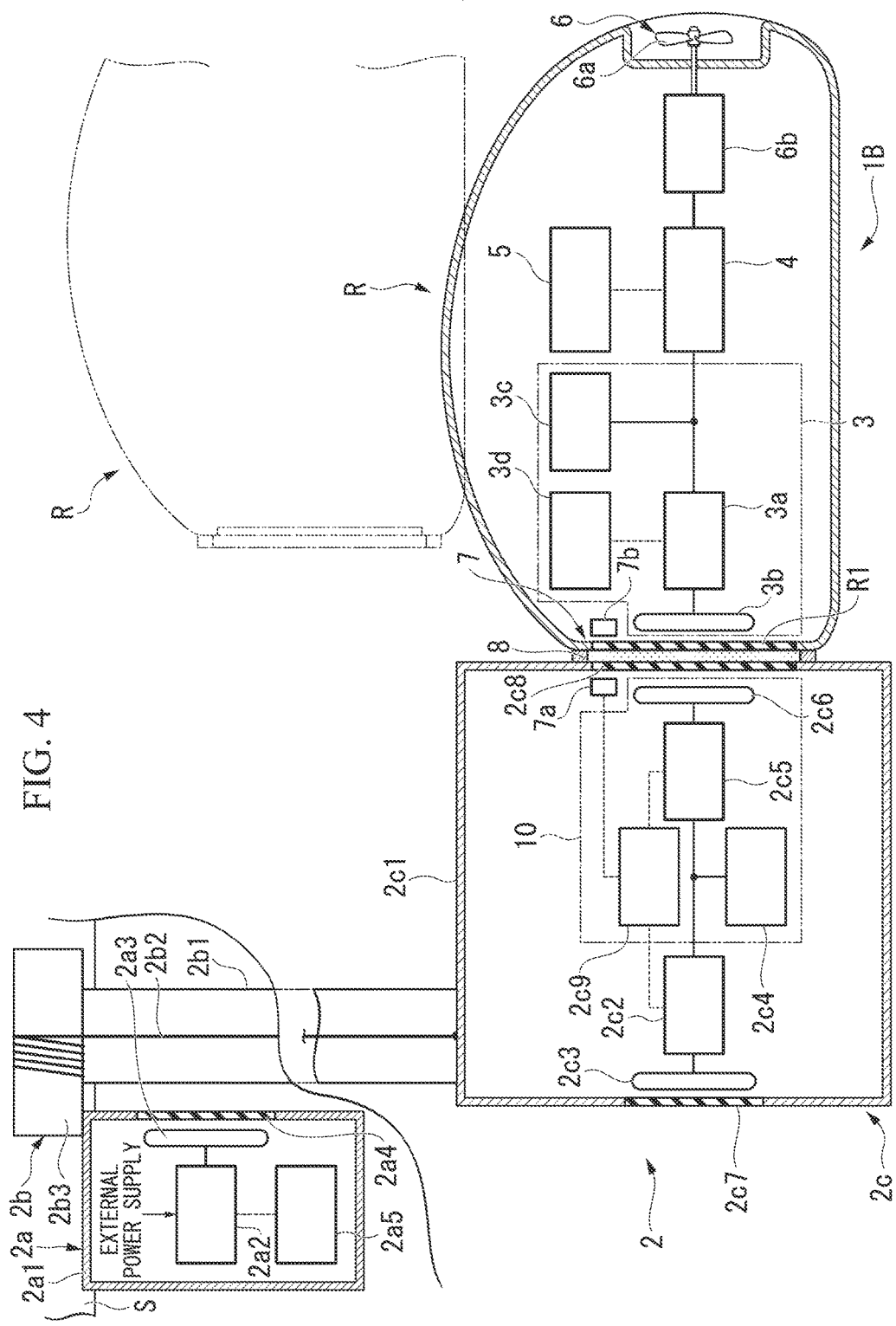
FIG. 4 is a schematic diagram showing a schematic configuration of a wireless power supply system according to a third embodiment of the present disclosure.

FIG. 4 is a schematic diagram showing a schematic configuration of a wireless power supply system 1B according to this embodiment. As shown in the drawing, in the wireless power supply system 1B according to this embodiment, the second magnetic field transparent portion 2c8 is disposed on a side wall of the case 2c1, and the power-transmitting coil 2c6 and the induction-type proximity sensor 7a are disposed to face the second magnetic field transparent portion 2c8. The magnetic field transparent portion R1 is disposed on a side wall of the underwater exploration robot R, and the power-receiving coil 3b and the metal piece 7b are disposed to face the magnetic field transparent portion R1. The thruster 6 is disposed on the opposite side of the magnetic field transparent portion R1. The contact portion 8 is disposed on a side surface of the underwater exploration robot R so as to surround the magnetic field transparent portion R1.

In the wireless power supply system 1B, when electric power is transmitted from the charging station 2c to the power-receiving device 3, the underwater exploration robot R (power-receiving device 3) is disposed on a side of the case 2c1 of the charging station 2c. In the wireless power supply system 1B, the contact portion 8 disposed in the underwater exploration robot R is pressed against the case 2c1 by the thruster 6 that rotates the screw propeller 6a so as to generate thrust in the left direction in the drawing during the transmission of electric power. Accordingly, the static frictional force between the contact portion 8 and the case 2c1 increases, and the underwater exploration robot R and the case 2c1 are fixed to each other. As a result, it is possible to stably transmit electric power. When an external force for separating the underwater exploration robot R and the case 2c1 acts for a certain reason and the external force is greater than the static frictional force between the contact portion 8 and the case 2c1, the underwater exploration robot R and the case 2c1 are separated from each other. However, since the underwater exploration robot R and the case 2c1 are not fitted to each other, the underwater exploration robot R and the case 2c1 are not damaged. Accordingly, in the wireless power supply system 1B according to this embodiment, it is possible to prevent the underwater exploration robot R and the case 2c1 from being damaged.

Figure 5:
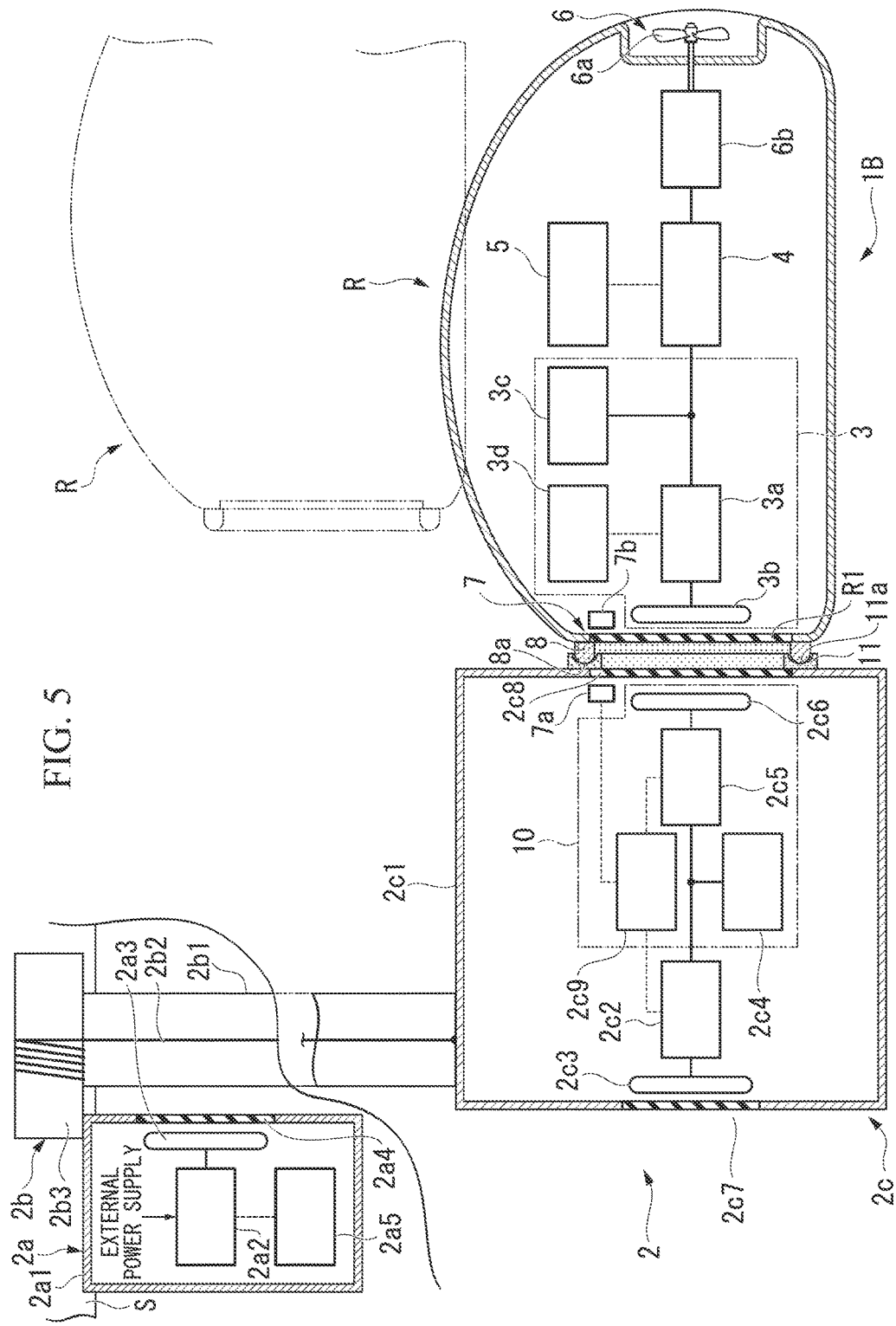
FIG. 5 is a schematic diagram showing a schematic configuration of a modification of the wireless power supply system according to the third embodiment of the present disclosure.

As shown in FIG. 5, the wireless power supply system 1B according to this embodiment may be provided with the receiver portion 11 described in the second embodiment.

Fourth Embodiment

A fourth embodiment of the present disclosure will be described below. In this embodiment, description of elements common to those in the first embodiment will be omitted or simplified.

Figure 6:
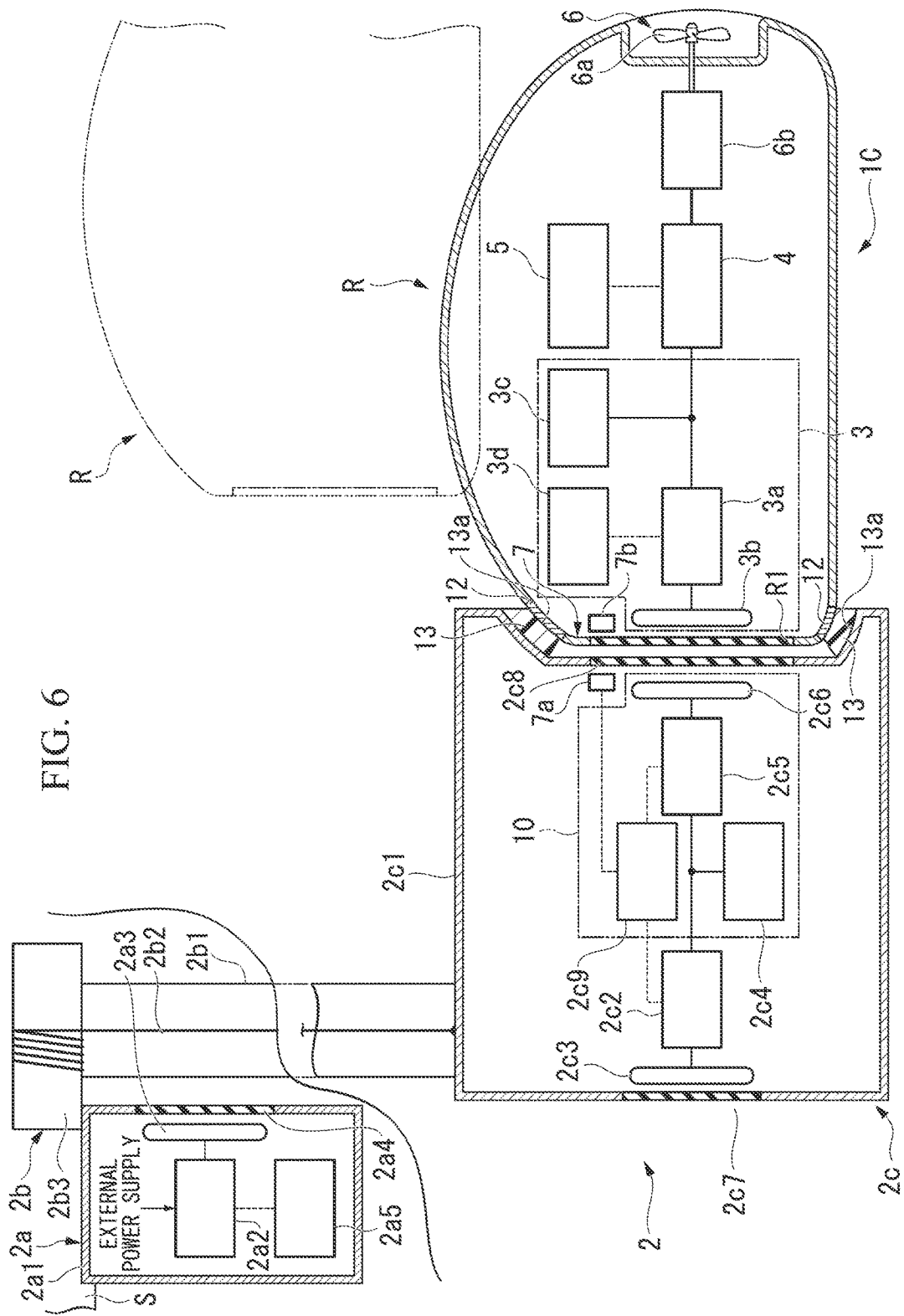
FIG. 6 is a schematic diagram showing a schematic configuration of a wireless power supply system according to a fourth embodiment of the present disclosure.

FIG. 6 is a schematic diagram showing a schematic configuration of a wireless power supply system 1C according to this embodiment. As shown in the drawing, in the wireless power supply system 1C according to this embodiment, the second magnetic field transparent portion 2c8 is disposed on a side wall of the case 2c1, and the power-transmitting coil 2c6 and the induction-type proximity sensor 7a are disposed to face the second magnetic field transparent portion 2c8, similarly to the third embodiment. The magnetic field transparent portion R1 is disposed on a side wall of the underwater exploration robot R, and the power-receiving coil 3b and the metal piece 7b are disposed to face the magnetic field transparent portion R1. The thruster 6 is disposed on the opposite side of the magnetic field transparent portion R1.

In the wireless power supply system 1C according to this embodiment, a part of a curved side wall of the underwater exploration robot R functions as a contact portion 12. That is, in this embodiment, the contact portion 12 is integrated with the curved side wall of the underwater exploration robot R. The case 2c1 of the charging station 2c is provided with a receiver portion 13 having a recessed portion 13a corresponding to the curved side wall of the underwater exploration robot R.

In the wireless power supply system 1C according to this embodiment having the aforementioned configuration, since the contact portion 12 is integrated with the curved side wall of the underwater exploration robot R, no additional member for installing the contact portion 12 is necessary.

Fifth Embodiment

A fifth embodiment of the present disclosure will be described below. In this embodiment, description of elements common to those in the first embodiment will be omitted or simplified.

Figure 7:
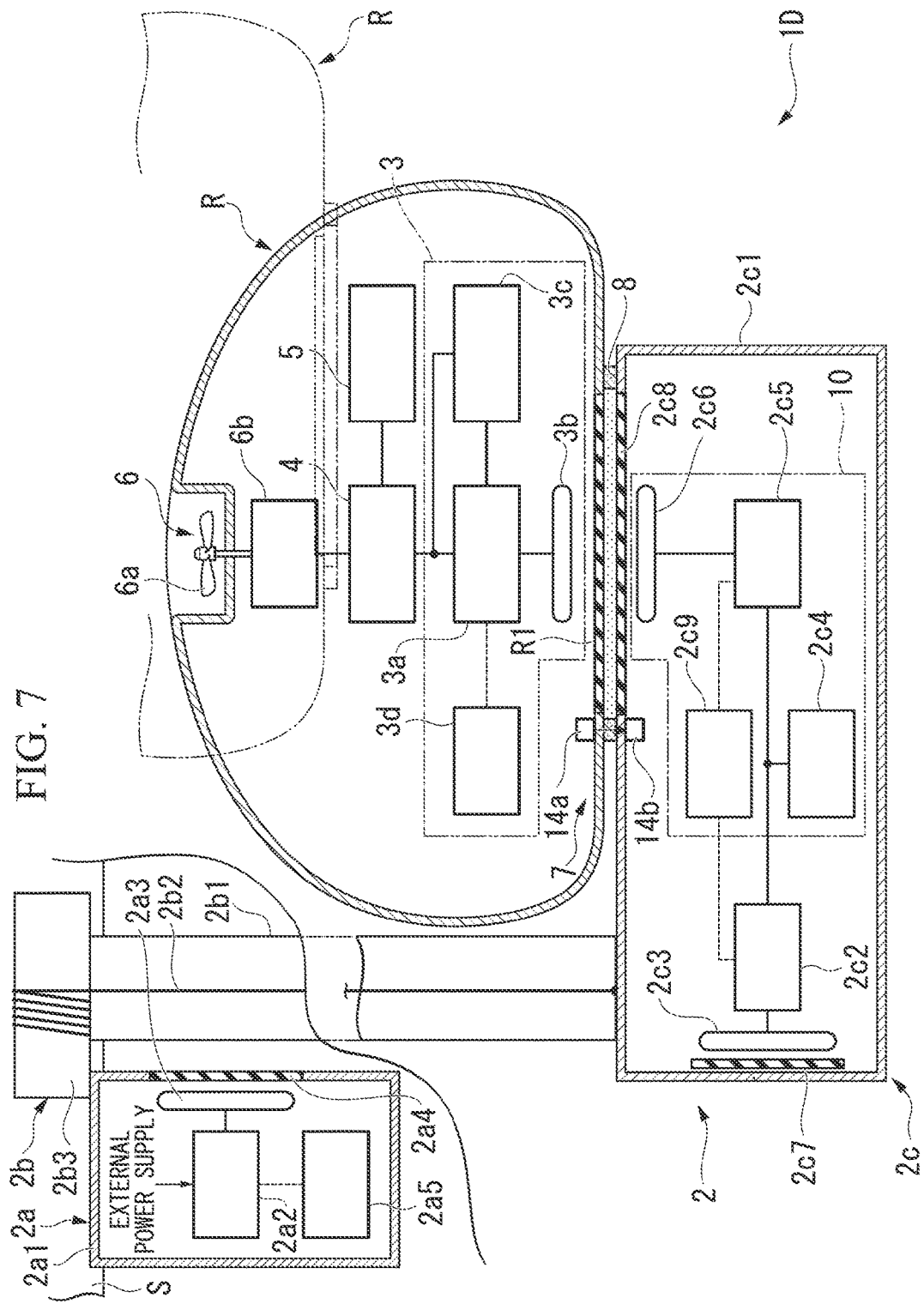
FIG. 7 is a schematic diagram showing a schematic configuration of a wireless power supply system according to a fifth embodiment of the present disclosure.

FIG. 7 is a schematic diagram showing a schematic configuration of a wireless power supply system 1D according to this embodiment. As shown in the drawing, the wireless power supply system 1D according to this embodiment includes a position detector 14 having an ultrasonic wave transmitter 14a (an ultrasonic wave transmitting device) and an ultrasonic wave receiver 14b (an ultrasonic wave receiving device).

The ultrasonic wave transmitter 14a is disposed in the underwater exploration robot R and transmits an ultrasonic wave or ultrasonic waves. In this embodiment, the contact portion 8 functions as a waveguide of ultrasonic waves. The ultrasonic wave receiver 14b is disposed in the case 2c1 of the charging station 2c, receives ultrasonic waves transmitted through the contact portion 8, and outputs the result of reception. The controller 2c9 is connected to the ultrasonic wave receiver 14b, and transmits electric power when a signal indicating reception of ultrasonic waves is input from the ultrasonic wave receiver 14b, judging that the case 2c1 and the underwater exploration robot R are located at the reference position. The controller 2c9 determines that the case 2c1 and the underwater exploration robot R are not located at the reference position and stops the transmission of electric power when the signal indicating reception of ultrasonic waves is not input from the ultrasonic wave receiver 14b.

In the wireless power supply system 1D according to this embodiment, the contact portion 8 functions as the waveguide of ultrasonic waves. Accordingly, when the underwater exploration robot R is separated from the charging station 2c, ultrasonic waves are not transmitted and the transmission of electric power is immediately stopped by the controller 2c9.

Accordingly, in the wireless power supply system 1D according to this embodiment, when the underwater exploration robot R and the case 2c1 are separated from each other due to an unexpected external force during the transmission of electric power, it is possible to stop the transmission of electric power so as to prevent unintended discharge of energy.

Sixth Embodiment

A sixth embodiment of the present disclosure will be described below. In this embodiment, description of elements common to those in the first embodiment will be omitted or simplified.

Figure 8:
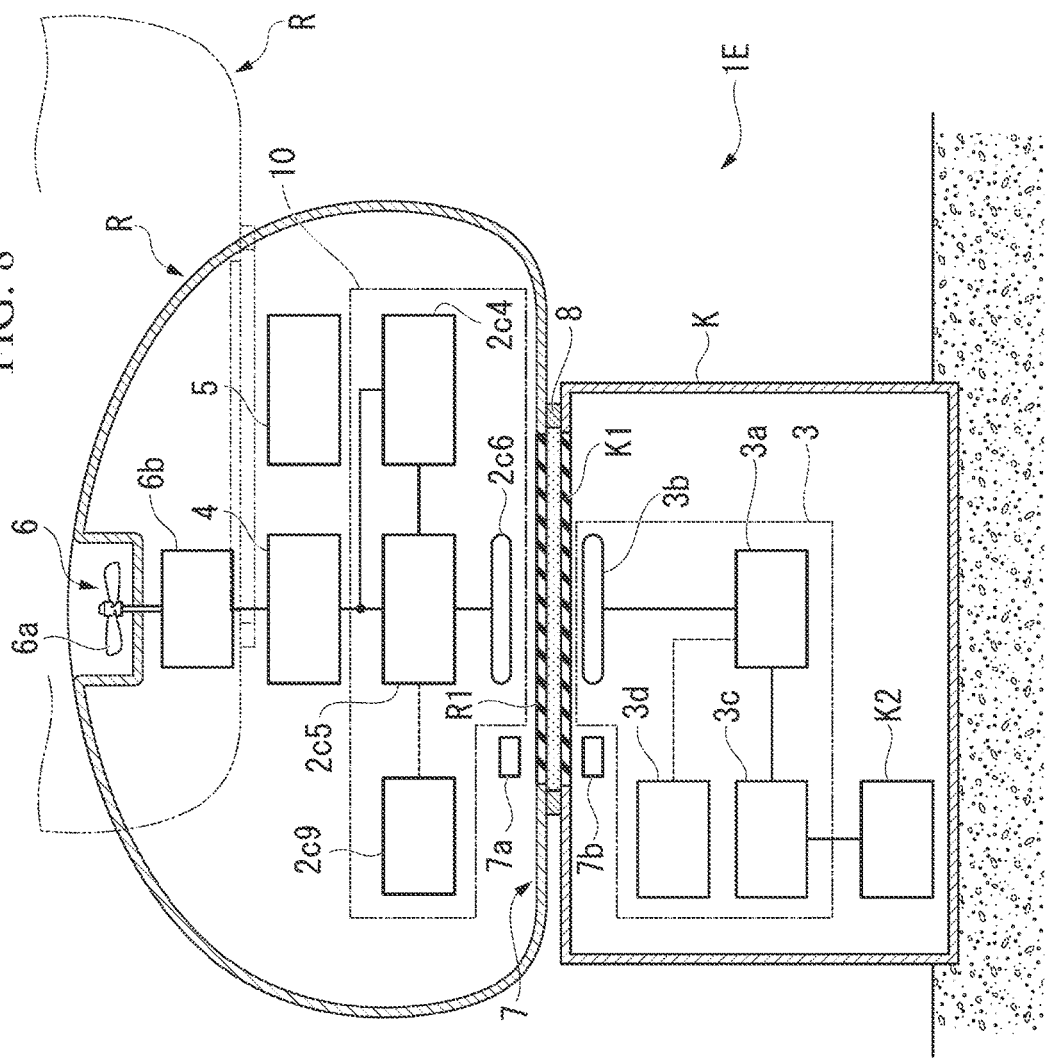
FIG. 8 is a schematic diagram showing a schematic configuration of a wireless power supply system according to a sixth embodiment of the present disclosure.

FIG. 8 is a schematic diagram showing a schematic configuration of a wireless power supply system 1E according to this embodiment. As shown in the drawing, in the wireless power supply system 1E according to this embodiment, the underwater exploration robot R is provided with the power-supplying device 10 instead of the power-receiving device 3. A power-receiving device 3 is disposed in a structure K that is installed under water and includes a magnetic field transparent portion K1.

In the wireless power supply system 1E according to this embodiment having this configuration, electric power is transmitted from the power-supplying device 10 disposed in the underwater exploration robot R to the power-receiving device 3 disposed in the structure K by wireless supply of electric power, and the electric power is used by a device K2 and the like that is mounted on the structure K and carries out a mission.

In the wireless power supply system 1E according to this embodiment, similarly to the wireless power supply system 1 according to the first embodiment, it is possible to prevent the underwater exploration robot R and the structure K from being damaged.

When this configuration is employed, the metal piece 7b of the position detector 7 is disposed in the structure K on which the power-receiving device 3 is mounted. On the other hand, the induction-type proximity sensor 7a of the position detector 7 is installed in the underwater exploration robot R on which the power-supplying device 10 is mounted. When the position detector 14 according to the fifth embodiment is employed, the ultrasonic wave transmitter 14a is disposed in the structure K and the ultrasonic wave receiver 14b is disposed in the underwater exploration robot R.

While the exemplary embodiments of the present disclosure have been described with reference to the accompanying drawings, the present disclosure is not limited to the embodiments. Various shapes and combinations of the elements described in the embodiments are only examples and can be modified in various forms depending on design requirements without departing from the gist of the present disclosure.

For example, in the aforementioned embodiments, the configuration in which the charging station 2c is raised and lowered has been described. However, the present disclosure is not limited to this configuration. For example, a configuration in which a power supply cable is installed under water and the charging station 2c is fixed to the power supply cable may be employed.

For example, in the first to third embodiments and in the fifth and sixth embodiments, the configuration in which the contact portion 8 has a ring shape has been described. However, the present disclosure is not limited to this configuration, and another shape or arrangement may be employed as long as the underwater exploration robot R is supported at a stable position with respect to the charging station 2c when the underwater exploration robot is pressed against the case 2c1 of the charging station 2c by the thrust generated from the thruster 6. For example, the contact portion may have an elliptical shape or a configuration in which a plurality of contact portions are arranged in a ring shape may be employed. In the latter case, it is possible to stably bring the contact portion into contact with the charging station 2c by providing three contact portions.

In the aforementioned embodiments, the configuration in which the charging station 2c is merely raised and lowered has been described. However, the present disclosure is not limited to this configuration and, for example, a configuration in which the charging station 2c navigates under water may be employed. That is, the structure in the present disclosure is not limited to a fixed structure, but may include a movable structure.

In the aforementioned embodiments, the configuration in which electric power is supplied from the power-supplying device to the power-receiving device under water has been described. However, the present disclosure is not limited to this configuration and a configuration in which electric power is supplied from the power-supplying device to the power-receiving device on surface of water may be employed.

A magnetic field resonance method has been employed as the wireless power supply method in the aforementioned embodiments, but an electromagnetic induction method may be employed or other methods may be employed. The type, the shape, and the size of the power-transmitting coil and the power-receiving coil are arbitrary as long as they can supply electric power between them in a wireless manner.

INDUSTRIAL APPLICABILITY

According to the present disclosure, it is possible to obtain a wireless power supply system that can prevent a mobile object and a structure from being damaged.

The invention claimed is:

1. A wireless power supply system that includes a power-supplying device mounted on one of a mobile object and a structure different from the mobile object and a power-receiving device mounted on the other of the mobile object and the structure and supplies electric power from the power-supplying device to the power-receiving device disposed to face the power-supplying device under water or on surface of water, the wireless power supply system comprising:
   a contact portion that is disposed in the mobile object and that comes in contact with the structure; and
   a thruster that presses the contact portion against the structure during the transmission of electric power.

2. The wireless power supply system according to claim 1, comprising a receiver portion that is disposed in the structure, receives the contact portion, and positions the mobile object.

3. The wireless power supply system according to claim 1, comprising:
   a position detecting device that detects a positional relationship between the power-supplying device and the power-receiving device; and
   a power transmission stopping device that stops the transmission of electric power when the detection result of the position detecting device indicates that the positional relationship between the power-supplying device and the power-receiving device departs from a reference position.

4. The wireless power supply system according to claim 2, comprising:
   a position detecting device that detects a positional relationship between the power-supplying device and the power-receiving device; and
   a power transmission stopping device that stops the transmission of electric power when the detection result of the position detecting device indicates that the positional relationship between the power-supplying device and the power-receiving device departs from a reference position.

5. The wireless power supply system according to claim 3, wherein the position detecting device includes a metal piece that is disposed in one of the mobile object and the structure on which the power-receiving device is mounted and a metal detecting device that is disposed in one of the mobile object and the structure on which the power-supplying device is mounted and detects the metal piece in a wireless manner.

6. The wireless power supply system according to claim 4, wherein the position detecting device includes a metal piece that is disposed in one of the mobile object and the structure on which the power-receiving device is mounted and a metal detecting device that is disposed in one of the mobile object and the structure on which the power-supplying device is mounted and detects the metal piece in a wireless manner.

7. The wireless power supply system according to claim 3, wherein the position detecting device includes an ultrasonic wave transmitting device that is disposed in one of the mobile object and the structure on which the power-receiving device is mounted and an ultrasonic wave receiving device that is disposed in one of the mobile object and the structure on which the power-supplying device is mounted.

8. The wireless power supply system according to claim 4, wherein the position detecting device includes an ultrasonic wave transmitting device that is disposed in one of the mobile object and the structure on which the power-receiving device is mounted and an ultrasonic wave receiving device that is disposed in one of the mobile object and the structure on which the power-supplying device is mounted.

9. The wireless power supply system according to claim 7, wherein the contact portion functions as a waveguide that transmits an ultrasonic wave transmitted from the ultrasonic wave transmitting device to the ultrasonic wave receiving device.

10. The wireless power supply system according to claim 8, wherein the contact portion functions as a waveguide that transmits an ultrasonic wave transmitted from the ultrasonic wave transmitting device to the ultrasonic wave receiving device.

* * * * *